United States Patent
Forrer, Jr. et al.

(10) Patent No.: US 7,346,806 B2
(45) Date of Patent: Mar. 18, 2008

(54) HARD DISK DRIVE BACKGROUND SCRUB METHODOLOGY

(75) Inventors: Thomas R. Forrer, Jr., Round Rock, TX (US); Jason Eric Moore, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 10/948,442

(22) Filed: Sep. 23, 2004

(65) Prior Publication Data

US 2006/0075289 A1    Apr. 6, 2006

(51) Int. Cl.
G06F 11/00    (2006.01)

(52) U.S. Cl. .......................................... 714/6; 711/114

(58) Field of Classification Search ................. None
See application file for complete search history.

(56) References Cited

U.S. PATENT DOCUMENTS

| | | | | |
|---|---|---|---|---|
| 5,267,242 A | * | 11/1993 | Lavallee et al. ................. 714/7 |
| 5,632,012 A | * | 5/1997 | Belsan et al. .................. 714/6 |
| 6,076,183 A | * | 6/2000 | Espie et al. .................. 714/764 |
| 6,101,614 A | * | 8/2000 | Gonzales et al. ............... 714/6 |
| 6,480,982 B1 | * | 11/2002 | Chan et al. .................. 714/764 |
| 6,715,116 B2 | * | 3/2004 | Lester et al. ................ 714/718 |
| 6,832,340 B2 | * | 12/2004 | Larson et al. .................. 714/42 |
| 6,848,063 B2 | * | 1/2005 | Rodeheffer et al. ............. 714/6 |
| 6,851,070 B1 | * | 2/2005 | Rodrigues et al. ............. 714/5 |
| 7,137,038 B2 | * | 11/2006 | New et al. ..................... 714/42 |
| 7,165,188 B1 | * | 1/2007 | Rodrigues et al. ............. 714/5 |
| 2001/0047497 A1 | * | 11/2001 | Larson et al. .................. 714/42 |
| 2004/0268179 A1 | * | 12/2004 | Stewart ......................... 714/8 |
| 2005/0028048 A1 | * | 2/2005 | New et al. ..................... 714/54 |
| 2005/0071557 A1 | * | 3/2005 | Kawamura et al. ......... 711/114 |
| 2005/0283655 A1 | * | 12/2005 | Ashmore ....................... 714/7 |

OTHER PUBLICATIONS

U.S. Appl. No. 10/948,415, Forrer, Jr. et al., Hard Disk Drive Data Scrub Methodology.

* cited by examiner

Primary Examiner—Christopher McCarthy
(74) Attorney, Agent, or Firm—Duke W. Yee; Diana R. Gerhardt; Wayne P. Bailey

(57) ABSTRACT

A system, method, and computer program product for recovering from data errors. In a SCSI hard drive system, when a unrecoverable data error condition is encountered, the logical block address is reassigned using information provided by the data scrubbing functionality of the SCSI hard drive.

6 Claims, 3 Drawing Sheets

HARD DISK DRIVE BACKGROUND SCRUB METHODOLOGY

CROSS REFERENCE TO RELATED APPLICATION

The present application is related to co-pending application entitled "HARD DISK DRIVE DATA SCRUB METHODOLOGY", Ser. No. 10/948,415, filed on even date herewith. The above related application is assigned to the same assignee as the present application and is incorporated herein by reference.

BACKGROUND OF THE INVENTION

1. Technical Field

The present invention relates generally to recovery from Unrecoverable Read errors on computer hard drives in RAID (Redundant Array of Independent Disks) configurations where the RAID functionality is provided by the system processor. More specifically this invention relates to the reporting and recovery of errors using the Small Computer System Interface (SCSI) protocol.

2. Description of Related Art

Computer systems are often arranged with redundant data storage in order to permit recovery of lost data, for example, from damaged media. Currently RAID controllers initiate background read operations on the hard drives attached to them in order to find locations on the media that may have been damaged, causing either hard data errors or recoverable data errors that require significant levels of Error Recovery. This functionality is called data scrubbing. If a hard error is encountered during scrubbing, the bad Logical Block Address (LBA) is reassigned and when the drive is a member of a RAID configuration (other than RAID 0), any lost data can be recreated and rewritten. Thus RAID data redundancy is maintained. This is usually accomplished transparent to the operating system (OS), application programs, and the user.

When a hard drive is attached to a host via a "just a bunch of disks (JBOD) host bus adapter, the adapter does not initiate this background data scrubbing activity. When JBOD drives are configured as RAID arrays where the RAID functionality is provided by the host CPU and the OS, rather than using a RAID adapter, the background scrubbing functionality is usually not included. This is mainly because significant system resources would be consumed to perform background data scrubbing on all the hard drive resources attached to it. Thus, in a system configuration where the OS provides RAID functionality (e.g., acts as RAID controller), if a drive in the RAID array fails followed by encountering a hard media error during the rebuild process, the rebuild will fail because the array was already running exposed (i.e., with no redundancy). For example, this can occur when using the IBM Advanced Interactive Operating system (AIX) Mirroring (RAID 1) that us used on an IBM eServer pSeries System. Further, some errors are not discovered during normal operation, because a hard error may occur in an LBA containing infrequently used data. In such cases a maintenance window has to be scheduled reasonably quickly so that the system can be brought down and a RAID 1 array can be recreated from backup tapes. Such issues are unacceptable in systems requiring high reliability.

SUMMARY OF THE INVENTION

In a preferred embodiment, the present invention describes using the data scrubbing functionality of SCSI hard drives to provide a higher level of data integrity in an OS implemented RAID environment.

In one example embodiment, if during background scrubbing a hard drive encounters a recoverable data error condition that needs a logical block address (LBA) reassigned, the LBA is reassigned in a way that is transparent to the system. This is because the drive has the data to write into the LBA after the LBA is reassigned. This is the same for a RAID array comprising either a JBOD—OS RAID implementation, or a RAID adapter configuration. If the drive encounters an Unrecoverable Read error or hard data error during its background scrubbing operation, the error is reported to the system so that correct data can be obtained from a redundant drive of the RAID array, and then written to the drive after the defective LBA has been reassigned. In this manner if a single drive fails the probability of encountering an unrecoverable data error during rebuild process is significantly reduced.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
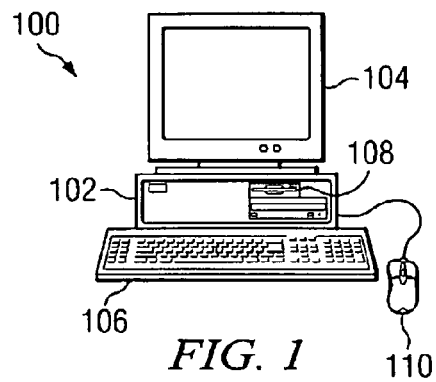
FIG. 1 shows a diagram of a computer system consistent with implementing a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
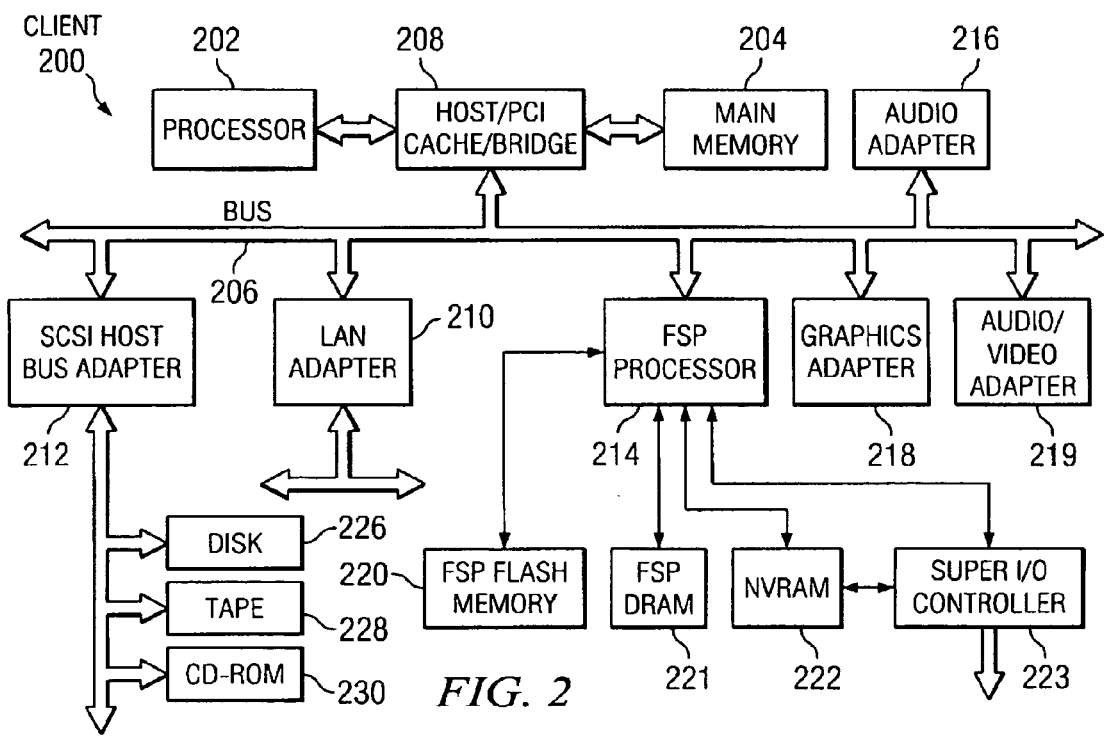
FIG. 2 shows a diagram of components of a computer system consistent with implementing a preferred embodiment of the present invention.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Figure 3:
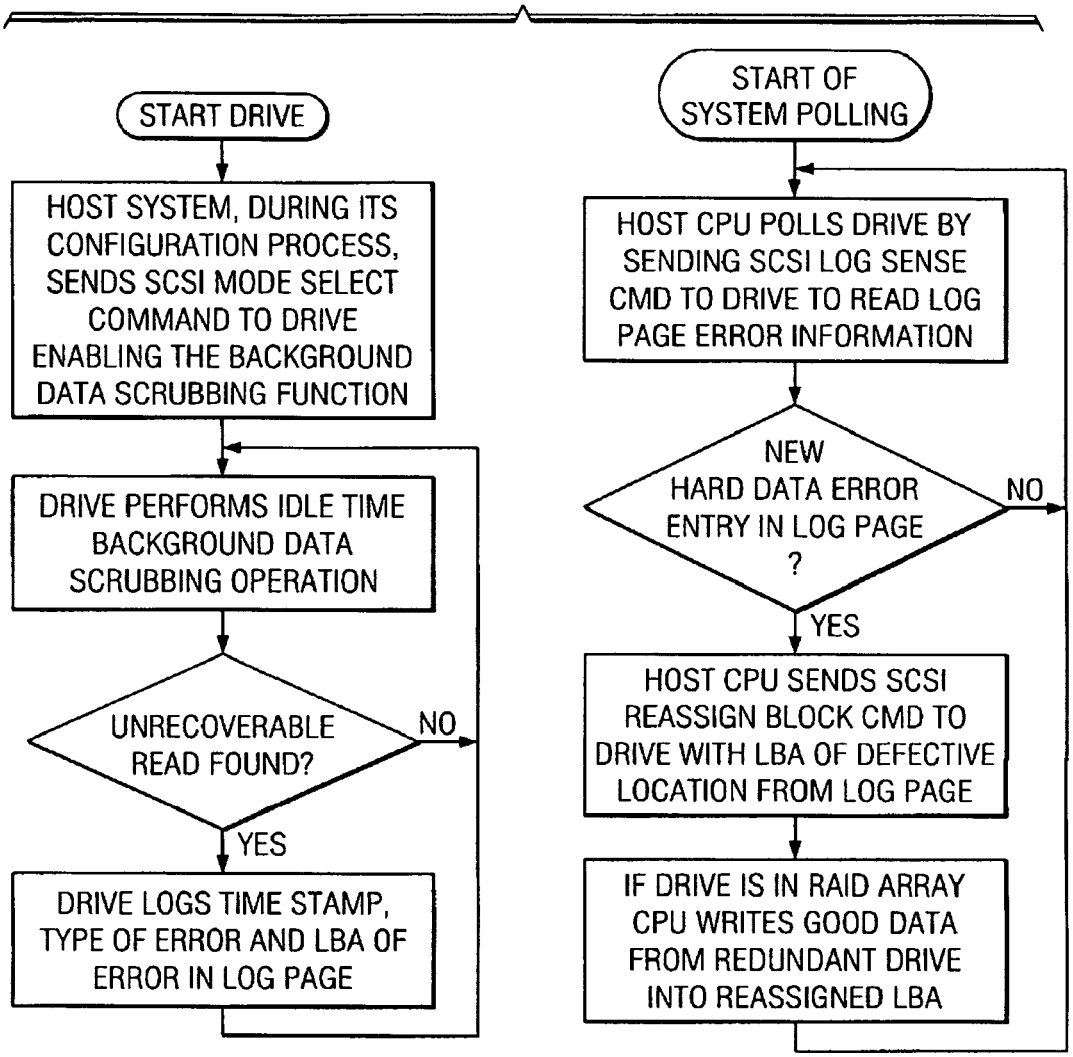
FIG. 3 shows process steps for implementing a preferred embodiment of the present invention.

In one embodiment, the present invention is described as a series of process steps shown in FIG. 3. This method assumes a drive data scrubbing feature, such as those available on SCSI or SAS protocol drives, is enabled. Drive 226 is thus included in a RAID array of the type described above, together with other similar or identical hard drives (not shown).

The process shown in FIG. 3 starts when the host operating system enables the data scrubbing feature when the drive is initialized or opened. During the time the drive is not being used (ie receiving read or write commands) the background data scrubbing function is occurring. If an unrecoverable data error is found the drive logs this information in its internal log pages. Then periodically the host system polls the drive by reading the log page information. If there is a new unrecoverable data error entry the host system sends a Reassign Block SCSI Command to the drive. After the reassign command completes successfully the host system reads the correct data off of the redundant drive and writes this data to the drive that had the hard error. This operation is done concurrently during the normal operation of the drive. This process continues until all hard data errors locations are reassigned. Then this process stops until the operating system determines it is time to poll the drive again for hard errors locations.

Figure 4:
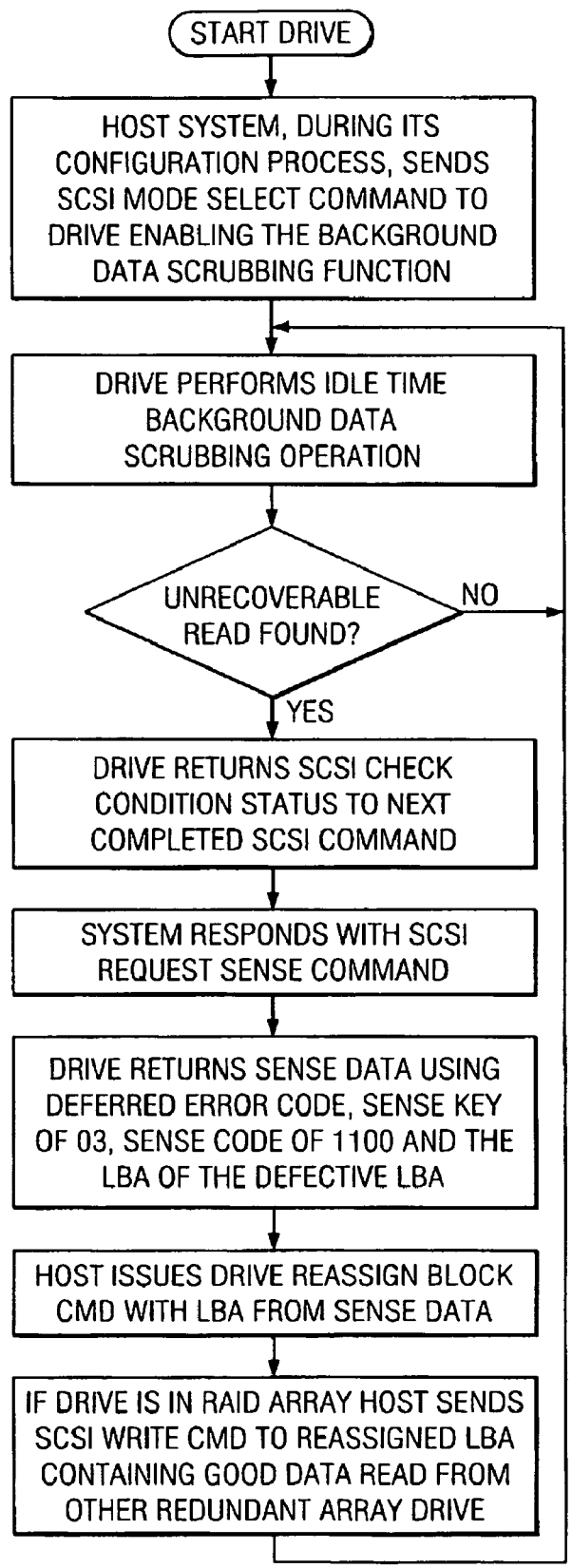
FIG. 4 shows process steps for implementing an alternative embodiment of the present invention.

Another embodiment is depicted in FIG. 4. This method is the same as the prior embodiment in that the host operating system enables the data scrubbing feature when the drive is initialized or opened. During the time the drive is not being used (ie receiving read or write commands) the background data scrubbing function is occurring. However when an uncorrectable data error is encountered the drive returns a Check Condition Status to the next command that was sent to the drive by the host system. The system responds with a Request Sense Command. The drive then returns Sense Data using a Deferred Error Code, a Sense Key of 03, a Sense Code of 1100 and the LBA of the defective media location. The host then issues a Reassign Block Command to the drive to reassign the defective LBA. Then the system reads the correct data from the redundant drive and writes it to the reassigned location. Again during this process the drive is still executing normal media access commands from the host system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In a computer configuration having a host operating system and a plurality of drives included in a RAID Array, a method for correcting unrecoverable data errors comprising the steps of:
    enabling all of the drives that are defined as a part of a RAID array to perform a background scrubbing operation during a drive idle time;
    generating an error notification when an unrecoverable data error is encountered during said scrubbing operation;
    communicating said error notification from a selected drive to said host system; and operating said host system in response to said error notification to correct said unrecoverable data error using data from a redundant drive included in said RAID Array, wherein said step of communicating said error notification comprises:
    returning a Check Condition Status request from said selected drive to said host system, in response to the next command sent to said selected drive from said host system.

2. The method of claim 1, wherein:
said host system responds to said Check Condition Status request by sending a Request Sense command to said selected drive, whereupon said selected drive returns a set of Sense Data associated with said unrecoverable data error to said host system.

3. The method of claim 2, wherein:
said Sense Data includes the LBA of said unrecoverable data error.

4. The method of claim 3, wherein:
said correction of said unrecoverable data error comprises sending a command from a CPU associated with said host system to said selected drive to reassign said LBA.

5. The method of claim 4, wherein:
said correction of said unrecoverable data error further comprises writing correct data from said redundant drive to said reassigned LBA.

6. The method of claim 5, wherein:
each of said drives comprises an SCSI hard drive.

* * * * *